US012610016B2

(12) United States Patent
Tu et al.

(10) Patent No.: US 12,610,016 B2
(45) Date of Patent: Apr. 21, 2026

(54) SCANNER REDIRECTION IN NESTED MODE

(71) Applicant: Omnissa, LLC, Mountain View, CA (US)

(72) Inventors: Zhongzheng Tu, Beijing (CN); Huiyong Huo, Beijing (CN); Mingsheng Zang, Beijing (CN); Kai Xiang, Beijing (CN); Ning Ge, Beijing (CN); Tao Jin, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 284 days.

(21) Appl. No.: 18/452,476

(22) Filed: Aug. 18, 2023

(65) Prior Publication Data

US 2025/0008030 A1 Jan. 2, 2025

(30) Foreign Application Priority Data

Jun. 30, 2023 (WO) ................ PCT/CN2023/104484

(51) Int. Cl.
*H04N 1/00* (2006.01)
*G06F 9/451* (2018.01)
*G06F 9/455* (2018.01)

(52) U.S. Cl.
CPC ......... *H04N 1/00209* (2013.01); *G06F 9/452* (2018.02); *G06F 9/45558* (2013.01); *G06F 2009/4557* (2013.01)

(58) Field of Classification Search
CPC . H04N 1/00209; G06F 9/452; G06F 9/45558; G06F 2009/4557
See application file for complete search history.

(56) References Cited

U.S. PATENT DOCUMENTS

| | | | |
|---|---|---|---|
| 10,230,855 B1 | 3/2019 | Sarreo | |
| 11,716,428 B1 * | 8/2023 | Tu ...................... | H04N 1/00037 |
| | | | 358/1.15 |
| 2008/0201485 A1 | 8/2008 | Patwardhan | |
| 2022/0100542 A1 * | 3/2022 | Voltz ................... | G06F 9/45558 |
| 2024/0205357 A1 * | 6/2024 | Huo ..................... | H04N 5/2621 |
| 2025/0008029 A1 * | 1/2025 | Tu ........................... | G06F 9/452 |
| 2025/0008030 A1 | 1/2025 | Tu | |

(Continued)

OTHER PUBLICATIONS

"Document Scanner—TWAIN, WIA, ISIS, or SANE," Jan. 7, 2020, Dynamsoft, 5 pages, https://www.dynamsoft.com/blog/insights/document-scanning-twain-wia-isis-sane.

*Primary Examiner* — Shahbaz Nazrul
(74) *Attorney, Agent, or Firm* — Kim & Stewart LLP

(57) ABSTRACT

A scanner redirection method for a remote desktop computer system that includes a client computer, a first virtual machine (VM), and a second VM, includes the steps of: receiving by the first VM from the second VM, a first request for an image, wherein the first request for the image is directed to virtual image capturing software in the first VM; in response to the first request for the image being directed to the virtual image capturing software, transmitting by the first VM to the client computer, a second request for the image, wherein the second request for the image is directed to an image capturing device connected to the client computer; and upon receiving the image from the client computer, transmitting by the first VM to the second VM, the image received from the client computer.

20 Claims, 12 Drawing Sheets

(56)　　　　　　　References Cited

U.S. PATENT DOCUMENTS

| | | | |
|---|---|---|---|
| 2025/0036446 A1* | 1/2025 | Tu ....................... | G06F 9/45558 |
| 2025/0080663 A1 | 3/2025 | Huo | |
| 2025/0130840 A1* | 4/2025 | Huo ................... | G06F 9/45558 |

* cited by examiner

Scanner Redirection Client Plugin          Image Capture Core

1200

START

1202 Receive request from virtual DS of first-hop VM for image

1204 Request image

1206 Acquire image from ICD and return image

1208 Request count value

1210 Acquire count value from ICD and return count value

1212 Image transmitter transmits image and count value to virtual DS of first-hop VM

END

SCANNER REDIRECTION IN NESTED MODE

CROSS-REFERENCE

This application is based upon and claims the benefit of priority from International Patent Application No. PCT/CN2023/104484, filed on Jun. 30, 2023, the entire contents of which are incorporated herein by reference.

BACKGROUND

Many organizations rely on remote desktop (RD) services to provide lean, flexible computing environments. Furthermore, some organizations using RD services rely on what is known as "nested mode." A user of a client computer such as a laptop indirectly accesses a target agent such as a virtual machine (VM) executing on a remote server. To indirectly access the target agent, the user first establishes an RD session between the client computer and a first agent such as a VM executing on a different remote server, referred to herein as a "first-hop VM." Then, the user establishes a second RD session between the first-hop VM and the target VM, the target VM also referred to herein as a "second-hop VM." There may be various reasons for such an arrangement such as the client computer not having direct access to the second-hop VM due to the organization's security policies.

RD scanning is an important feature required by organizations using RD services. Through RD scanning, an application on a remote computer acquires images from image capturing devices (ICDs) connected to a separate client computer. Because the remote computer is not directly connected to the ICD, the remote computer and client computer communicate with each other via an RD session to enable the agent computer to control the ICD and acquire images therefrom. Processing of scan commands to realize RD scanning is often inefficient and often results in crashes. Such processing is made even more complex and inefficient if the application is in a second-hop VM. In such a case, the second-hop VM is not even directly connected to the client computer to transmit scan commands thereto. A robust and efficient method is needed to realize scanner redirection between a client computer, a first-hop VM, and a second-hop VM.

SUMMARY

Accordingly, one or more embodiments provide for an RD computer system, wherein the RD computer system includes a client computer, a first-hop VM, and a second-hop VM. The client computer includes RD software that is configured to communicate with an ICD. According to some embodiments, the RD software includes a "data source," which is a component of the RD software that communicates with the ICD. According to other embodiments, the RD software includes an "image capture core," which is a service running in an operating system (OS) that exposes application programming interfaces (APIs) for communicating with the ICD. The APIs are used for, e.g., adjusting settings of an ICD and requesting images therefrom.

One or more embodiments provide a scanner redirection method for an RD computer system that includes a client computer, a first-hop VM, and a second-hop VM. The client computer communicates with the first-hop VM via a first RD session, and the first-hop VM communicates with the second-hop VM via a second RD session. The scanner redirection method includes the steps of: receiving by the first-hop VM from the second-hop VM, a first request for an image, wherein the first request for the image is directed to virtual image capturing software in the first-hop VM; in response to the first request for the image being directed to the virtual image capturing software, transmitting by the first-hop VM to the client computer, a second request for the image, wherein the second request for the image is directed to an image capturing device connected to the client computer, and wherein in response to the second request for the image, the client computer acquires the image from the image capturing device and then transmits the image to the first-hop VM; and upon receiving the image from the client computer, transmitting by the first-hop VM to the second-hop VM, the image received from the client computer.

Further embodiments include a non-transitory computer-readable storage medium comprising instructions that cause an RD computer system to carry out the above scanner redirection method, as well as an RD computer system configured to carry out the above scanner redirection method.

DETAILED DESCRIPTION

Figure 1:
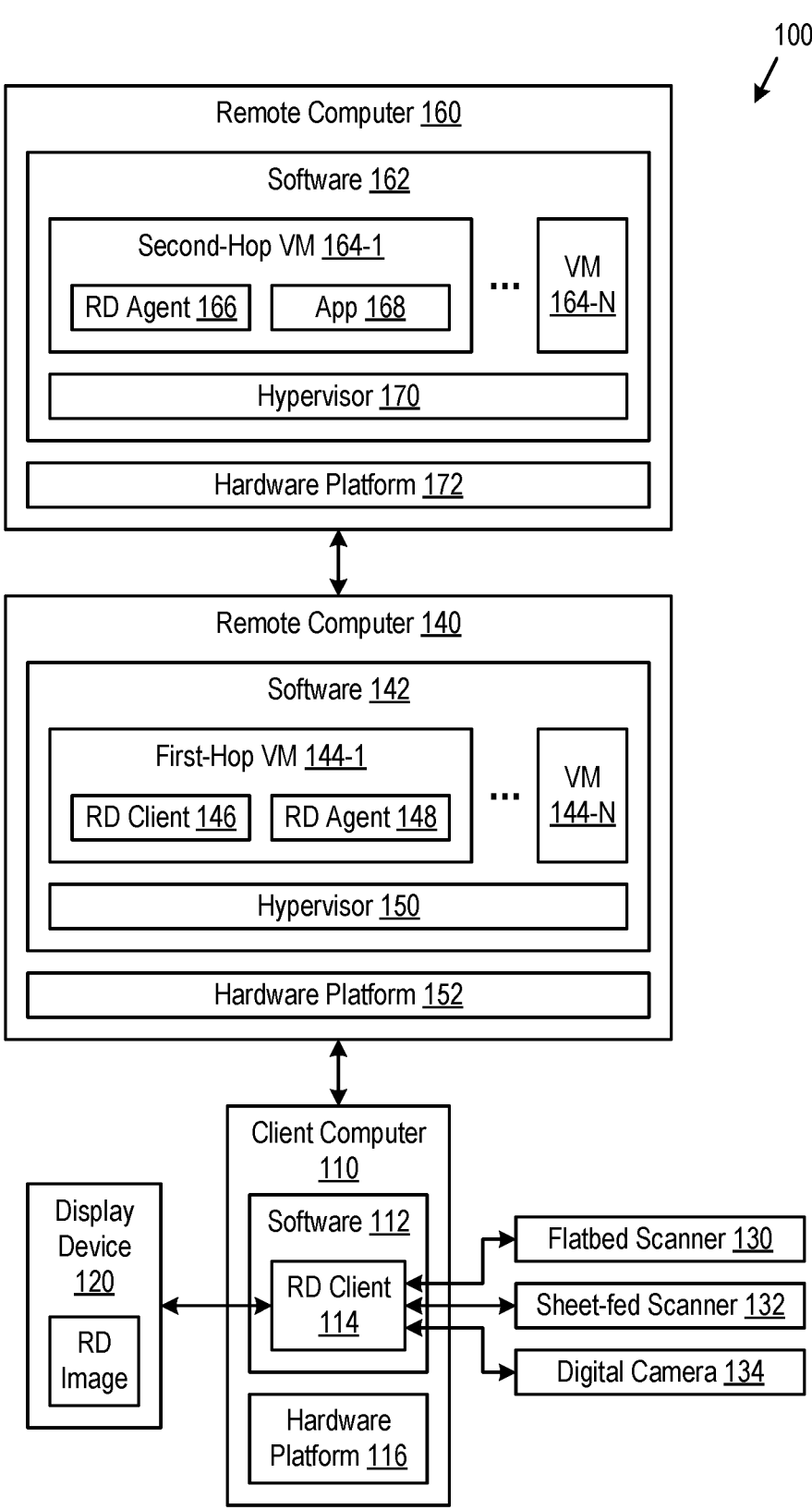
FIG. 1 is a block diagram of an RD computer system in which embodiments may be implemented.

Techniques are described for realizing scanner redirection during an RD session between a client computer, a first-hop VM, and a second-hop VM. The second-hop VM executes an application that consumes images from ICDs, and the ICDs are connected to the client computer. To acquire an image from an ICD, the application of the second-hop VM requests the image from the first-hop VM. The first-hop VM then requests the image from the client computer. The client computer then acquires the image from the ICD and transmits it to the first-hop VM to be forwarded from the first-hop VM to the application of the second-hop VM.

To enable the above acquiring of the image, the client computer, first-hop VM, and second-hop VM make use of various RD software. There is "agent" RD software, which is software that enables the hosting of RDs. There is also "client" RD software, which is software that enables accessing of such RDs. According to embodiments, the client computer includes client RD software for accessing an RD hosted by agent RD software of the first-hop VM. The first-hop VM also includes client RD software for accessing an RD hosted by agent RD software of the second-hop VM.

Such client and agent RD software enable the above acquiring of the image as follows. The agent RD software of the second-hop VM requests the image from the client RD software of the first-hop VM. Then, the agent RD software of the first-hop VM requests the image from the client RD software of the client computer. Then, the client RD software of the client computer acquires the image and returns it to the agent RD software of the first-hop VM. Finally, the client RD software of the first-hop VM forwards the image to the agent RD software of the second-hop VM.

According to some embodiments, the client computer, the first-hop VM, and the second-hop VM utilize the same scanning protocol such as the TWAIN protocol. Pursuant to the common scanning protocol, applications of the client computer, first-hop VM, and second-hop VM utilize "data source managers" and "data sources." For the first-hop VM and second-hop VM, the data source managers communicate with "virtual" data sources, the virtual data source of the second-hop VM requesting images from the first-hop VM, and the virtual data source of the first-hop VM requesting images from the client computer. For the client computer, the data source manager communicates with a data source that acquires images from ICDs.

According to other embodiments, the client computer has a different OS than that of the first-hop VM and second-hop VM. As a result, the client computer uses one scanning protocol such as the Image Capture (ICA) Framework, and the first-hop VM and second-hop VM use another scanning protocol such as the TWAIN protocol. Pursuant to their respective scanning protocol, the first-hop VM and second-hop VM still utilize data source managers and virtual data sources. Pursuant to the other scanning protocol, the client computer utilizes an "image capture core" that communicates directly with ICDs (not through a separate data source component) to acquire images. These and further aspects of the invention are discussed below with respect to the drawings.

FIG. 1 is a block diagram of an RD computer system 100 in which embodiments may be implemented. RD computer system 100 includes a client computer 110 and remote computers 140 and 160 (remote from client computer 110). For example, client computer 110 may be a laptop, desktop computer, or server in a private data center controlled by a particular organization. Remote computers 140 and 160 may be servers provisioned in a private data center controlled by the particular organization, servers provisioned in a public data center that includes servers of other organizations, or servers provisioned in different data centers (each data center being either public or private).

Client computer 110 is constructed on a hardware platform 116 such as an x86 architecture platform. Hardware platform 116 includes conventional components of a computing device (not shown), such as one or more central processing units (CPUs), memory such as random-access memory (RAM), local storage such as one or more magnetic drives or solid-state drives (SSDs), and one or more network interface cards (NICs). The CPU(s) are configured to execute instructions such as executable instructions that perform one or more operations described herein, which may be stored in the memory. The NIC(s) enable client computer 110 to communicate with remote computer 140 over a network (not shown) such as the Internet.

Hardware platform 116 supports software 112, which includes an RD client application 114 running on a commodity OS (not shown). For example, RD client 114 may be VMware Horizon® Client, available from VMware, Inc. The term "desktop" in remote desktop (RD) refers to an instance of an interactive environment provided by an OS and software applications, typically in the form of display and sound output and keyboard and mouse input. Through RD client 114, a user accesses RDs from any location.

Remote computers 140 and 160 are constructed on hardware platforms 152 and 172, respectively, such as x86 architecture platforms. Hardware platforms 152 and 172 each includes the conventional components of a computing device (not shown) discussed above with respect to hardware platform 116. CPU(s) of hardware platforms 152 and 172 are each configured to execute instructions such as executable instructions that perform one or more operations described herein, which may be stored in respective memory. NIC(s) of hardware platform 152 enable client computer 140 to communicate with client computer 110 and remote computer 160 over networks (not shown) such as the Internet and a local area network (LAN), respectively. NIC(s) of hardware platform 172 enable remote computer 160 to communicate with remote computer 140.

Hardware platforms 152 and 172 support software 142 and 162, respectively. Software 142 and 162 include hypervisors 150 and 170, respectively, which are virtualization software layers that support VM execution spaces. VMs 144 are concurrently instantiated and executed in the VM execution space of remote computer 140, and VMs 164 are concurrently instantiated and executed in the VM execution space of remote computer 160. For example, hypervisors 150 and 170 may be VMware ESX® hypervisors, available from VMware, Inc.

In embodiments illustrated herein, RDs are running in VMs 144 and 164. A first-hop VM 144-1 of VMs 144 hosts a first RD for the user, the first RD being accessible through an RD session between client computer 110 and remote computer 140. A second-hop VM 164-1 of VMs 164 hosts a second RD for the user, the second RD being accessible through an RD session between remote computers 140 and 160.

VM 144-1 includes an RD client application 146, which may be, e.g., another instance of VMware Horizon® Client, available from VMware, Inc. VMs 144-1 and 164-1 include RD agent applications 148 and 166, respectively. RD clients 114 and 146 and RD agents 148 and 166 are also referred to individually and collectively herein as RD software, RD clients 114 and 146 being client RD software, and RD agents 148 and 166 being agent RD software. RD agent 148 of first-hop VM 144-1 communicates with RD client 114 of client computer 110 to establish the RD session between client computer 110 and remote computer 140. Through that RD session, the user accesses an RD hosted by first-hop VM 144-1. RD agent 166 of second-hop VM 164-1 communicates with RD client 146 of first-hop VM 144-1 to establish the other RD session between remote computers 140 and 160. Through that RD session, the user accesses an RD hosted by second-hop VM 164-1.

RD agent 166 periodically transmits to RD client 146, an updated image of the RD hosted by second-hop VM 164-1. RD agent 148 periodically transmits to RD client 114, an updated image of the RD hosted by first-hop VM 144-1. The image of the RD hosted by second-hop VM 164-1 is incorporated into the image of the RD hosted by first-hop VM 144-1. Accordingly, through the image received at RD client 114, the user is able to see the RD hosted by second-hop VM 164-1. To display the RD image, RD client 114 communicates with a display device 120 such as a monitor on which the user views the image.

RD client 114 is configured to execute a scanning protocol such as the TWAIN protocol or the ICA framework. RD client 114 acquires images from three ICDs connected to client computer 110: a flatbed scanner 130, a sheet-fed scanner 132, and a digital camera 134. To do so, RD client 114 communicates with drivers (not shown) installed in client computer 110 to control the ICDs. RD client 114 transmits images to RD agent 148, and RD client 146 forwards images to RD agent 166.

VM 164-1 includes an application 168, which consumes images created by the ICDs connected to client computer 110. To acquire images, application 168 is modified to handle scanner redirection. For example, application 168 may be Adobe® Photoshop.® A particular configuration of RD computer system 100 is illustrated in FIG. 1, but it should be recognized that one or more embodiments may be practiced with other computer system configurations.

Figure 2:
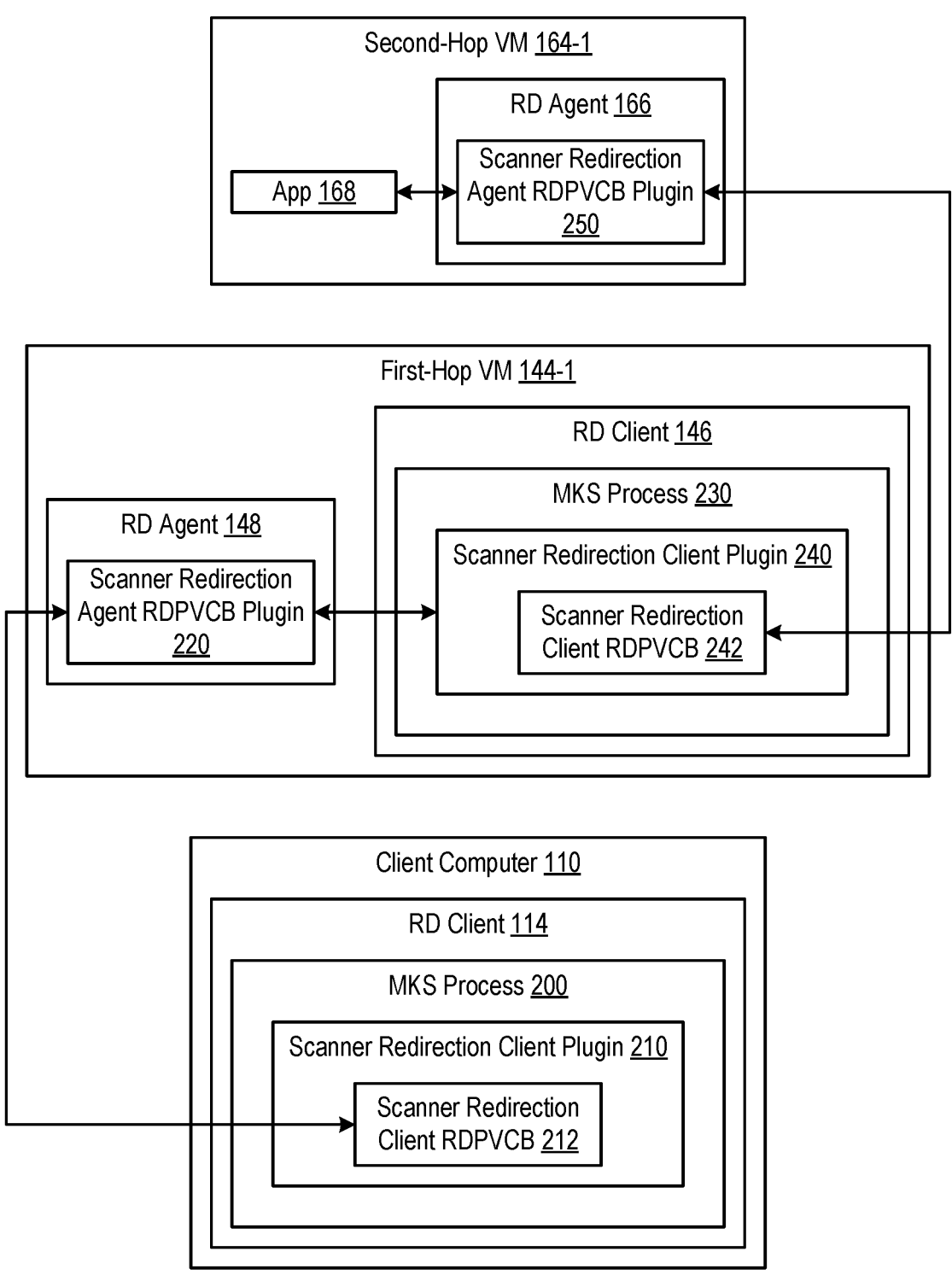
FIG. 2 is a block diagram illustrating communication between a client computer, a first-hop VM, and a second-hop VM of the RD computer system.

FIG. 2 is a block diagram illustrating communication between client computer 110, first-hop VM 144-1, and second-hop VM 164-1. RD client 114 of client computer 110 includes a mouse, keyboard, screen (MKS) process 200. When the user performs actions in the RD hosted by first-hop VM 144-1 such as clicking a mouse or typing on a keyboard, the user's actions are received by MKS process 200. MKS process 200 transmits those actions to first-hop VM 144-1 to update the RD. Additionally, when accessing the RD hosted by second-hop VM 164-1, MKS process 200 transmits the user's actions to RD agent 148, and RD client 146 forwards the user's actions to RD agent 166 to update the RD hosted by second-hop VM 164-1.

MKS process 200 includes a scanner redirection client plugin 210, which interacts with ICDs to provide scanner redirection functionalities. Scanner redirection client plugin 210 includes a scanner redirection client remote desktop protocol virtual channel bridge (RDPVCB) 212, referred to herein as client RDPVCB 212. Client RDPVCB 212 is communication software that is configured to communicate with first-hop VM 144-1 via transmission control protocol (TCP) or user datagram protocol (UDP) channels.

RD agent 148 of first-hop VM 144-1 includes a scanner redirection agent RDPVCB plugin 220, referred to herein as agent RDPVCB plugin 220. Agent RDPVCB plugin 220 is communication software that is configured to communicate with client computer 110 via the TCP or UDP channels of client RDPVCB 212. RD client 146 of first-hop VM 144-1 includes an MKS process 230, which further includes a scanner redirection client plugin 240 that agent RDPVCB plugin 220 is configured to communicate with. Scanner redirection client plugin 240 interacts with scanner redirection client plugin 210 through agent RDPVCB plugin 220 to request scanner redirection functionalities. Scanner redirection client plugin 240 includes a scanner redirection client RDPVCB 242, referred to herein as client RDPVCB 242.

Client RDPVCB 242 is communication software that is configured to communicate with second-hop VM 164-1 via TCP or UDP channels.

RD agent 166 of second-hop VM 164-1 includes a scanner redirection agent RDPVCB plugin 250, referred to herein as agent RDPVCB plugin 250. Agent RDPVCB plugin 250 is communication software that is configured to communicate with first-hop VM 144-1 via the TCP or UDP channels of client RDPVCB 242. Agent RDPVCB plugin 250 is also configured to communicate with application 168. Scanner redirection functionalities are enabled via the communication path between application 168 and the ICDs via agent RDPVCB plugin 250, to client RDPVCB 242, to agent RDPVCB plugin 220, and to client RDPVCB 212.

Figure 3:
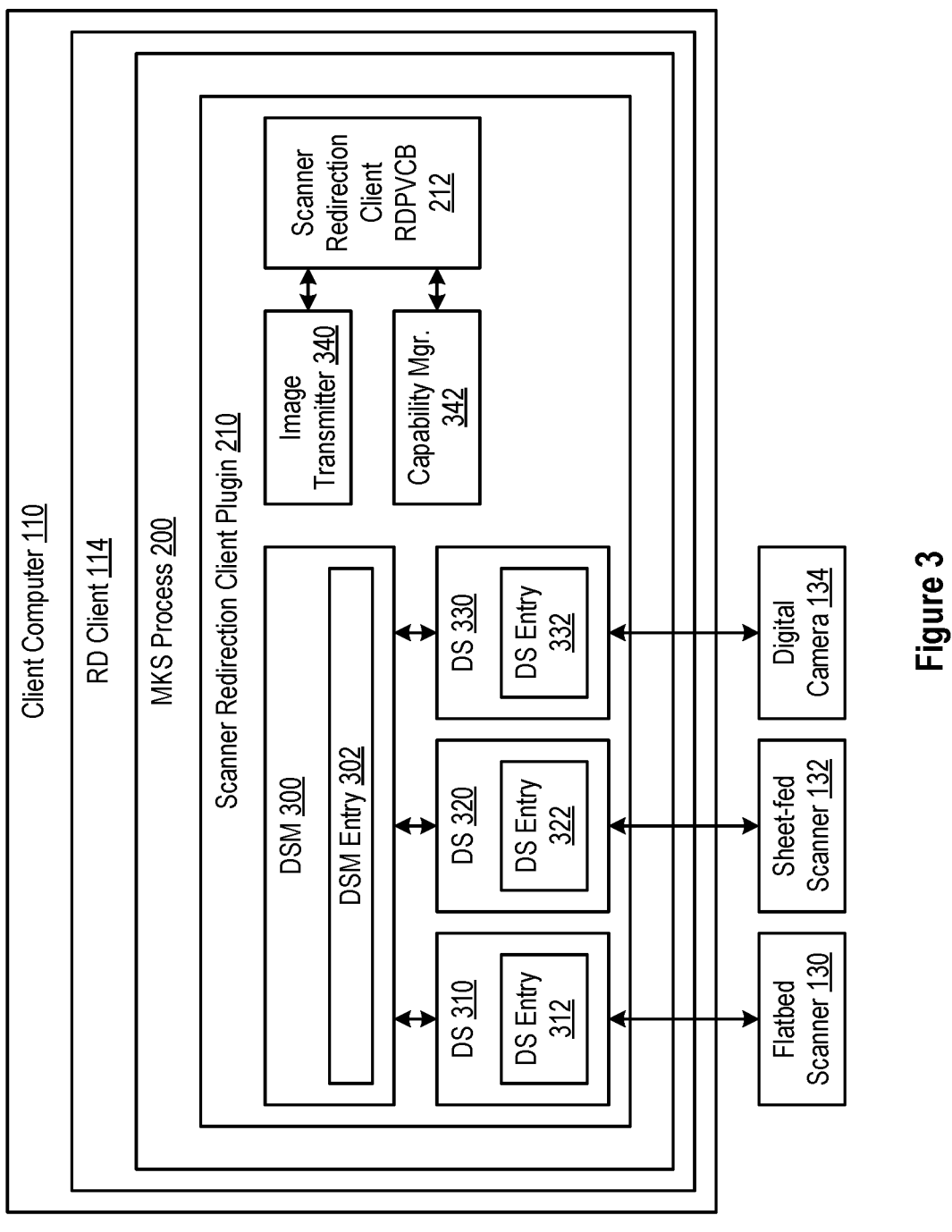
FIG. 3 is a block diagram of the client computer and a group of ICDs connected to the client computer, according to a first embodiment.

FIG. 3 is a block diagram of client computer 110 and connected ICDs 130, 132, and 134, according to the first embodiment. According to the first embodiment, client computer 110 uses the same scanning protocol as first-hop VM 144-1 and second-hop VM 164-1, e.g., the TWAIN protocol. In the example of FIG. 3, there are three drivers installed in client computer 110 for controlling the depicted ICDs, one for controlling flatbed scanner 130, one for controlling sheet-fed scanner 132, and one for controlling digital camera 134.

Scanner redirection client plugin 210 includes a data source manager (DSM) 300 that communicates with data sources (DSs) 310, 320, and 330. DS 310 communicates with a driver to control flatbed scanner 130, DS 320 communicates with another driver to control sheet-fed scanner 132, and DS 330 communicates with another driver to control digital camera 134. To communicate with ICDs, scanner redirection client plugin 210 calls a "DSM entry" function 302 to provide commands to DSM 300. DSM 300 then calls a "DS entry" function 312, 322, or 332 to transmit commands to DS 310, 320 or 330, respectively. The relevant DS then returns results to DSM 300 via return values of the DS entry call. Similarly, DSM 300 returns results to scanner redirection client plugin 210 via DSM entry 302 return values.

When one of the DSs acquires an image from a corresponding ICD, scanner redirection client plugin 210 instructs an image transmitter 340 to transmit the image to first-hop VM 144-1 via client RDPVCB 212. Additionally, one of the DSs may acquire capabilities from a corresponding ICD such as different supported resolutions for acquired images. Scanner redirection client plugin 210 instructs a capability manager 342 to transmit the capabilities to first-hop VM 144-1 via client RDPVCB 212. If the user specifies to adjust settings for a particular ICD, scanner redirection client plugin 210 instructs the corresponding DS via DSM 300 to control the ICD to adjust those settings.

Figure 4:
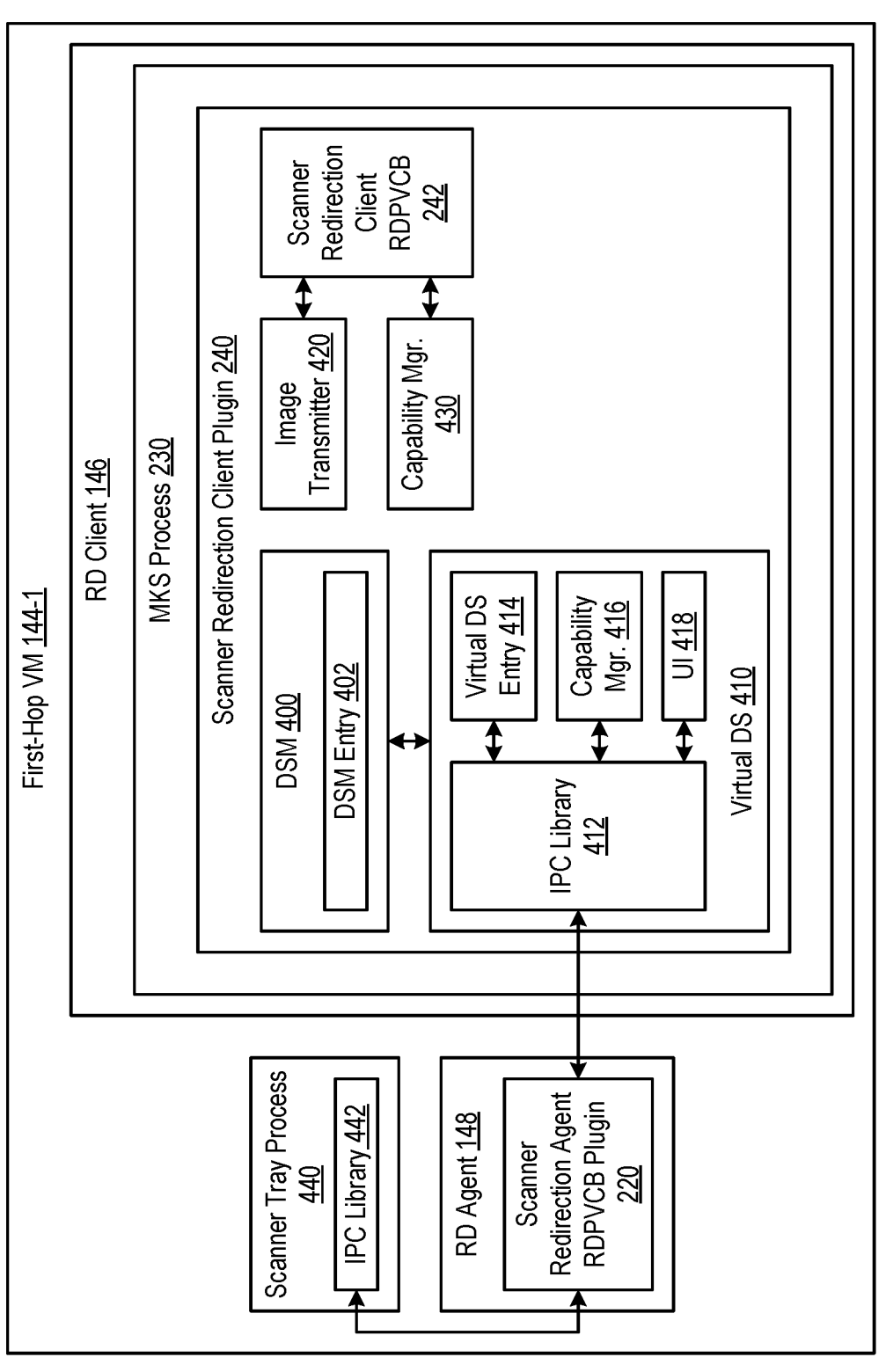
FIG. 4 is a block diagram of the first-hop VM, according to embodiments.

FIG. 4 is a block diagram of first-hop VM 144-1, according to embodiments. In addition to RD client 146 and RD agent 148, first-hop VM 144-1 includes a scanner tray process 440, which is used for selecting an ICD connected to client computer 110 for scanner redirection functionalities. Scanner tray process 440 includes an IPC library 442, which facilitates communications with agent RDPVCB plugin 220. Scanner tray process 440 also includes a list of ICDs (not shown) for which drivers have been installed in client computer 110. For example, to interact with scanner tray process 440, the user may click a toolbar menu item of first-hop VM 144-1, which results in scanner tray process 440 showing the contents of the list of ICDs. The user may then click on a name of an ICD to select that ICD so that future requests from first-hop VM 144-1 to client computer 110 specify the selected ICD as the target of the requests.

Scanner redirection client plugin 240 includes a DSM 400 that communicates with a virtual DS 410. Instead of communicating directly with an ICD, virtual DS 410 communicates with client computer 110, e.g., to request images. Specifically, scanner redirection client plugin 240 calls a "DSM entry" function 402 to provide commands to DSM 400. DSM 400 then calls a "virtual DS entry" function 414 to transmit commands to virtual DS 410. Virtual DS 410 also returns results to DSM 400 via return values of virtual DS entry 414 calls. Similarly, DSM 400 returns results to scanner redirection client plugin 240 via DSM entry 402 return values.

In addition to virtual DS entry 414, virtual DS 410 includes an IPC library 412, a capability manager 416, and a user interface (UI) 418. IPC library 412 facilitates communications between agent RDPVCB plugin 220, virtual DS entry 414, capability manager 416, and UI 418. Capability manager 416 caches capabilities of various ICDs such as different resolutions those ICDs can acquire images at, those capabilities being received from capability manager 342 of client computer 110. Capability manager 416 transmits those capabilities to UI 418 to be displayed to the user in the RD hosted by first-hop VM 144-1. Then, via UI 418, the user adjusts various settings such as which resolutions to acquire images at. Capability manager 416 transmits specified adjustments to client computer 110 via agent RDPVCB plugin 220 to be applied to a selected ICD.

Through UI 418, the user also triggers the acquiring of one or more images by the selected ICD. Such requests are transmitted to client computer 110 via agent RDPVCB plugin 220, and then one or more images are received from client computer 110. Specifically, images are received by virtual DS 410 via agent RDPVCB plugin 220. Virtual DS 410 then returns the images to DSM 400 via virtual DS entry 414.

Scanner redirection client plugin 240 is configured to provide scanner redirection functionalities for application 168 of second-hop VM 164-1 (not just for first-hop VM 144-1). Accordingly, scanner redirection client plugin 240 includes an image transmitter 420 and a capability manager 430. When virtual DS 410 acquires an image from client computer 110, scanner redirection client plugin 240 instructs image transmitter 420 to transmit the image to second-hop VM 164-1 via client RDPVCB 242. When virtual DS 410 acquires capabilities of ICDs from client computer 110, scanner redirection client plugin 240 instructs capability manager 430 to transmit the capabilities to second-hop VM 164-1 via client RDPVCB 242. If the user specifies in the RD hosted by second-hop VM 164-1, to adjust settings for a particular ICD, capability manager 430 receives those settings from second-hop VM 164-1. Scanner redirection client plugin 240 then instructs virtual DS 410 via DSM 400 to adjust those settings. Such instructions are forwarded by virtual DS 410 to capability manager 342 of client computer 110 to control the ICD to adjust those settings.

Figure 5:
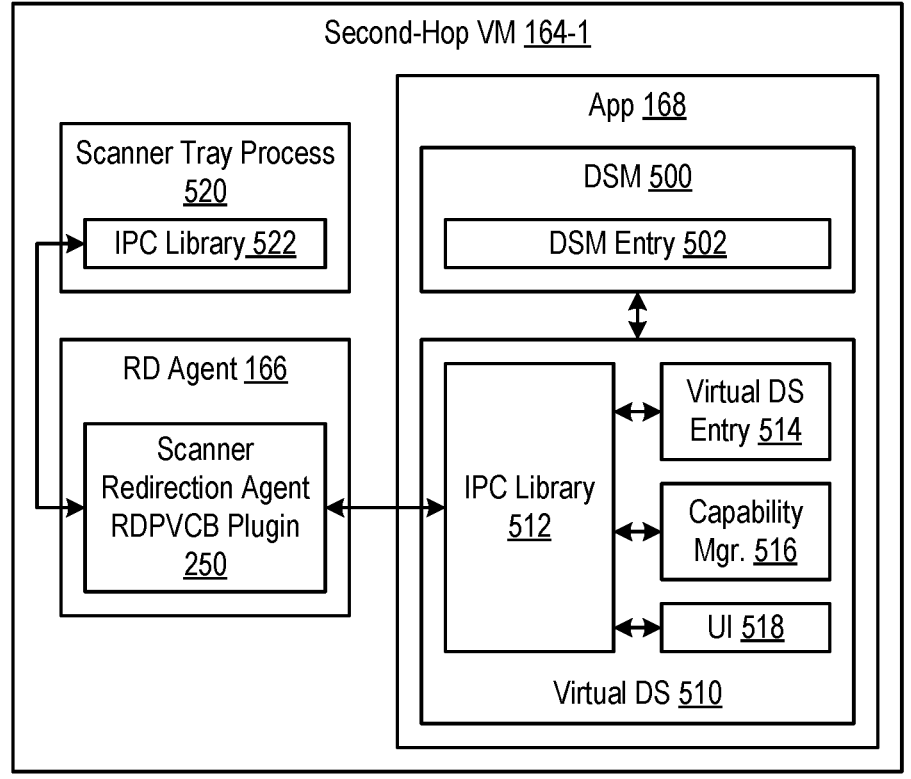
FIG. 5 is a block diagram of the second-hop VM, according to embodiments.

FIG. 5 is a block diagram of second-hop VM 164-1, according to embodiments. In addition to RD agent 166 and application 168, second-hop VM 164-1 includes a scanner tray process 520, which is used for selecting virtual DS 410 of first-hop VM 144-1 for scanner redirection functionalities. Scanner tray process 520 includes an IPC library 522, which facilitates communications with agent RDPVCB plugin 250. Like scanner tray process 440 of first-hop VM 144-1, scanner tray process 520 includes a list of ICDs (not shown).

Furthermore, scanner tray process 520 includes in that list, the name of virtual DS 410 for the user to select. For example, to interact with scanner tray process 520, the user may click a toolbar menu item of second-hop VM 164-1, which results in scanner tray process 520 showing the contents of the list of ICDs. The user may then click on the name of virtual DS 410 so that future requests from second-hop VM 164-1 specify virtual DS 410 as the target of the request. If the user has also selected a particular ICD from scanner tray process 440 of first-hop VM 144-1, such requests are then forwarded by first-hop VM 144-1 to client computer 110.

Application 168 includes a DSM 500 that communicates with a virtual DS 510. Instead of communicating directly with an ICD, virtual DS 510 communicates with first-hop VM 144-1, e.g., to request images. Specifically, application 168 calls a "DSM entry" function 502 to provide commands to DSM 500. DSM 500 then calls a "virtual DS entry" function 514 to transmit commands to virtual DS 510. Virtual DS 510 also returns results to DSM 500 via return values of virtual DS entry 514 calls. Similarly, DSM 500 returns results via DSM entry 502 return values.

In addition to virtual DS entry 514, virtual DS 510 includes an IPC library 512, a capability manager 516, and a UI 518. IPC library 512 facilitates communications between agent RDPVCB plugin 250, virtual DS entry 514, capability manager 516, and UI 518. Capability manager 516 caches capabilities of various ICDs such as different resolutions those ICDs can acquire images at, the capabilities being received from capability manager 430 of first-hop VM 144-1. Capability manager 516 transmits those capabilities to UI 518 to be displayed to the user in the RD hosted by second-hop VM 164-1. Then, via UI 518, the user adjusts various settings such as which resolutions to acquire images at.

Capability manager 516 transmits specified adjustments to first-hop VM 144-1 via agent RDPVCB plugin 250. In response, capability manager 430 of first-hop VM 144-1 transmits the specified adjustments to capability manager 342 of client computer 110 to be applied to a selected ICD. Through UI 518, the user also triggers the acquiring of one or more images by the selected ICD. Such requests are transmitted to first-hop VM 144-1 via agent RDPVCB plugin 250 to be forwarded to client computer 110. Then, one or more images are received from client computer 110 via first-hop VM 144-1. Specifically, images are received by virtual DS 510 via agent RDPVCB plugin 250. Virtual DS 510 then returns the images to DSM 500 via virtual DS entry 514.

Figure 6:
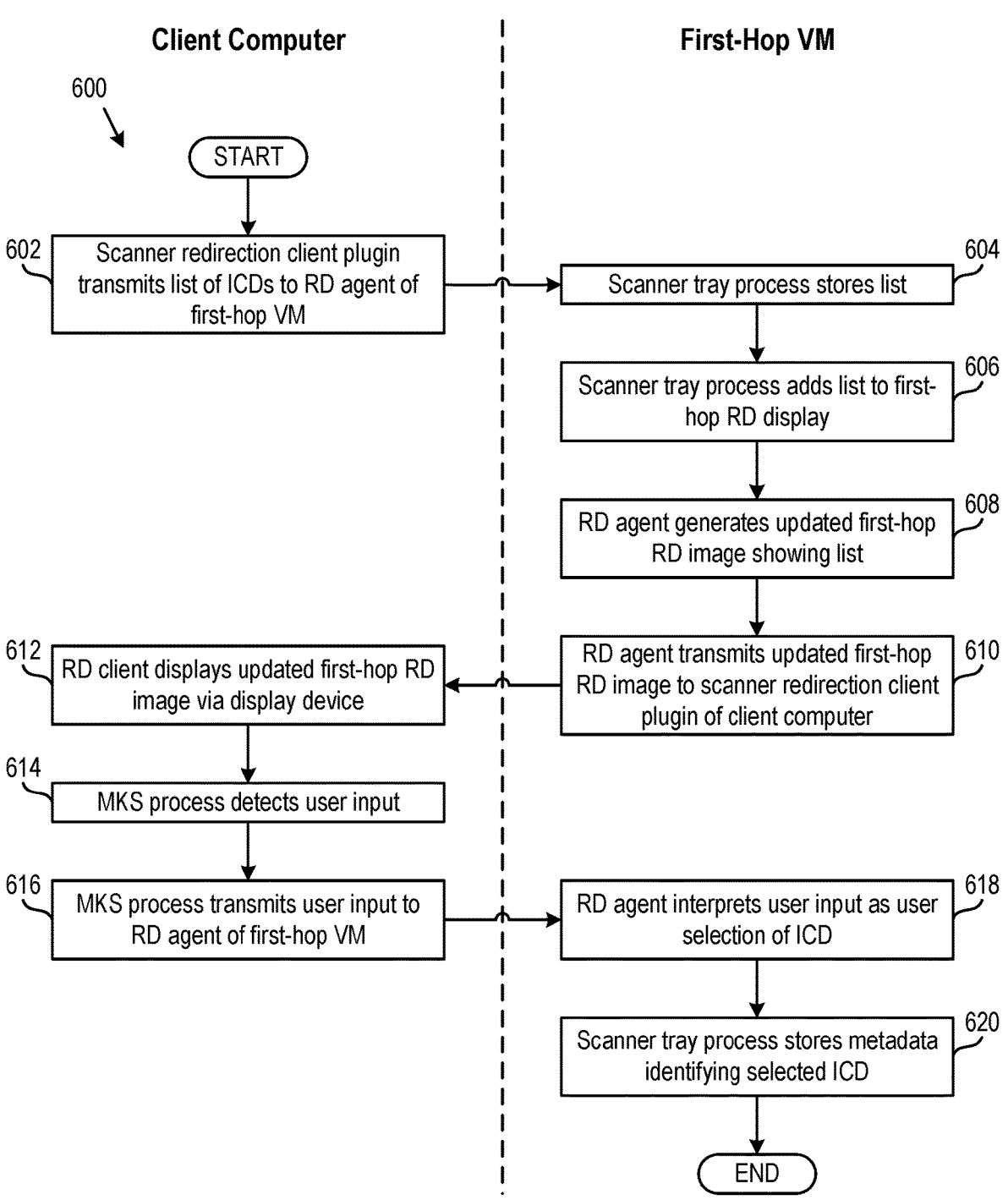
FIG. 6 is a flow diagram of a method performed by the client computer and first-hop VM to select for the first-hop VM, an ICD connected to the client computer for RD scanning functionalities, according to embodiments.

FIG. 6 is a flow diagram of a method 600 performed by client computer 110 and first-hop VM 144-1 to select for first-hop VM 144-1, an ICD connected to client computer 110 for RD scanning functionalities, according to embodiments. At step 602, scanner redirection client plugin 210 transmits a list of ICDs to RD agent 148 via a TCP or UDP channel between client RDPVCB 212 and agent RDPVCB plugin 220. At step 604, scanner tray process 440 stores the list. At step 606, scanner tray process 440 adds the list to the RD display of first-hop VM 144-1, e.g., in response to the user clicking a corresponding toolbar menu item. At step 608, RD agent 148 generates an updated RD image, which shows the list added to the RD display by scanner tray process 440. At step 610, RD agent 148 transmits the updated RD image to scanner redirection client plugin 210 of client computer 110 via the TCP or UDP channel.

At step 612, RD client 114 displays the RD image via display device 120. At step 614, MKS process 200 detects user input, e.g., the user clicking a mouse. At step 616, MKS process 200 transmits the user input to RD agent 148 of first-hop VM 144-1. At step 618, RD agent 148 interprets the user input as user selection of one of the ICDs of the list. At step 620, scanner tray process 440 stores metadata identifying the selected ICD. After step 620, method 600 ends.

Figure 7:
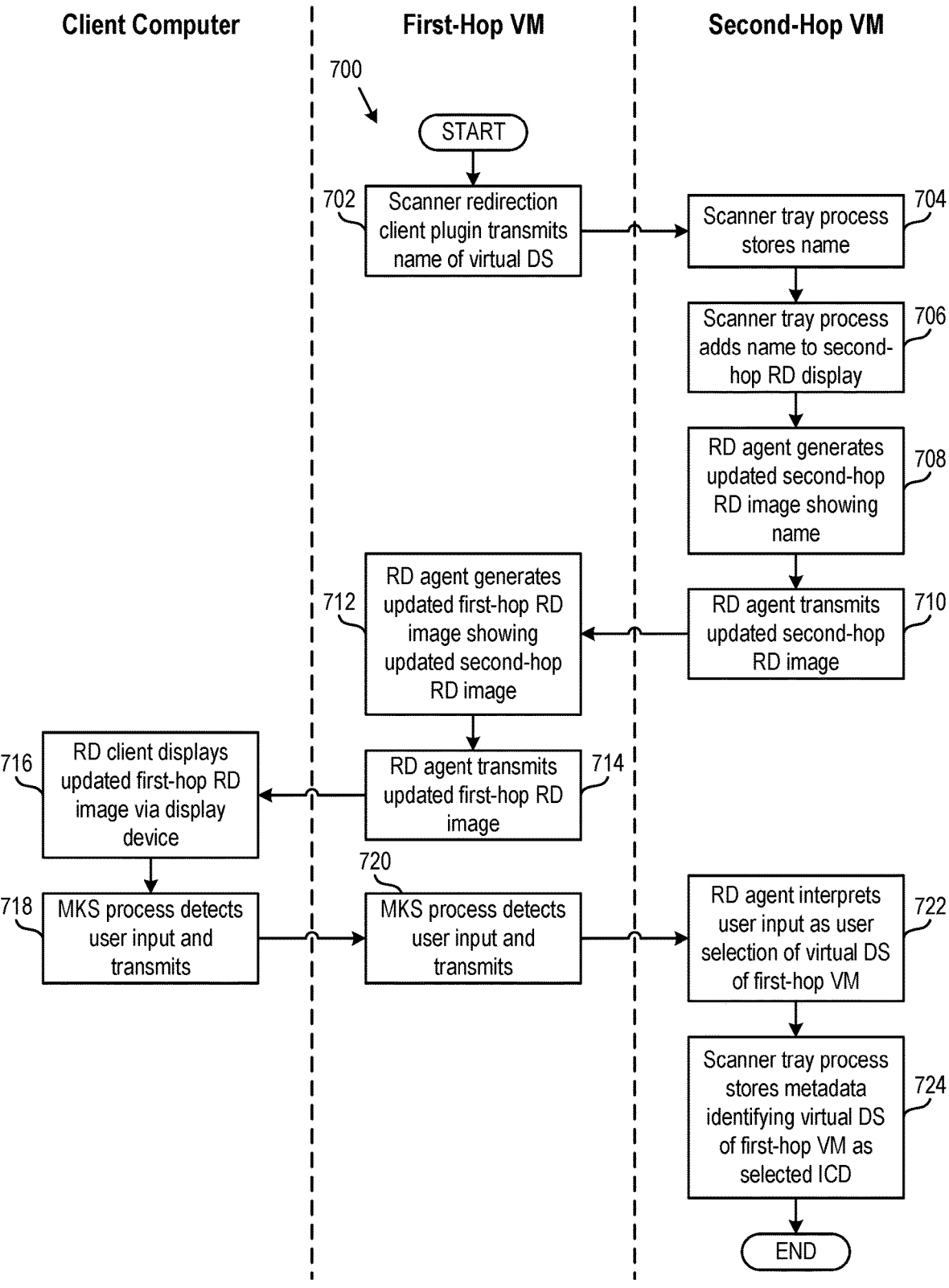
FIG. 7 is a flow diagram of a method performed by the client computer, first-hop VM, and second-hop VM to select for the second-hop VM, a virtual data source of the first-hop VM for RD scanning functionalities, according to embodiments.

FIG. 7 is a flow diagram of a method 700 performed by client computer 110, first-hop VM 144-1, and second-hop VM 164-1 to select for second-hop VM 164-1, virtual DS 410 of first-hop VM 144-1 for RD scanning functionalities, according to embodiments. At step 702, scanner redirection client plugin 240 transmits a name of virtual DS 410 to RD agent 166 of second-hop VM 164-1 via a TCP or UDP channel between client RDPVCB 242 and agent RDPVCB plugin 250. At step 704, scanner tray process 520 stores the name in a list of ICDs. At step 706, scanner tray process 520 adds the list to the RD display of second-hop VM 164-1, e.g., in response to the user clicking a corresponding toolbar menu item.

At step 708, RD agent 166 generates an updated RD image, which shows the name of virtual DS 410 of first-hop VM 144-1. At step 710, RD agent 166 transmits the updated RD image to scanner redirection client plugin 240 of first-hop VM 144-1 via the TCP or UDP channel. At step 712, RD agent 148 generates an updated RD image of first-hop VM 144-1, which shows the updated RD image of second-hop VM 164-1. At step 714, RD agent 148 transmits the updated RD image of first-hop VM 144-1 to scanner redirection client plugin 210 of client computer 110 via a TCP or UDP channel between agent RDPVCB plugin 220 and client RDPVCB 212.

At step 716, RD client 114 displays the RD image via display device 120. At step 718, MKS process 200 detects user input, e.g., the user clicking a mouse. MKS process 200 then transmits the user input to RD agent 148 of first-hop VM 144-1 via the TCP or UDP channel between client RDPVCB 212 and agent RDPVCB plugin 220. At step 720, MKS process 230 detects the user input and transmits the user input to RD agent 166 of second-hop VM 164-1 via the TCP or UDP channel between client RDPVCB 242 and agent RDPVCB plugin 250. At step 722, RD agent 166 interprets the user input as user selection of virtual DS 410 of first-hop VM 144-1. At step 724, scanner tray process 520 stores metadata identifying virtual DS 410 as a selected ICD. After step 724, method 700 ends.

Figure 8:
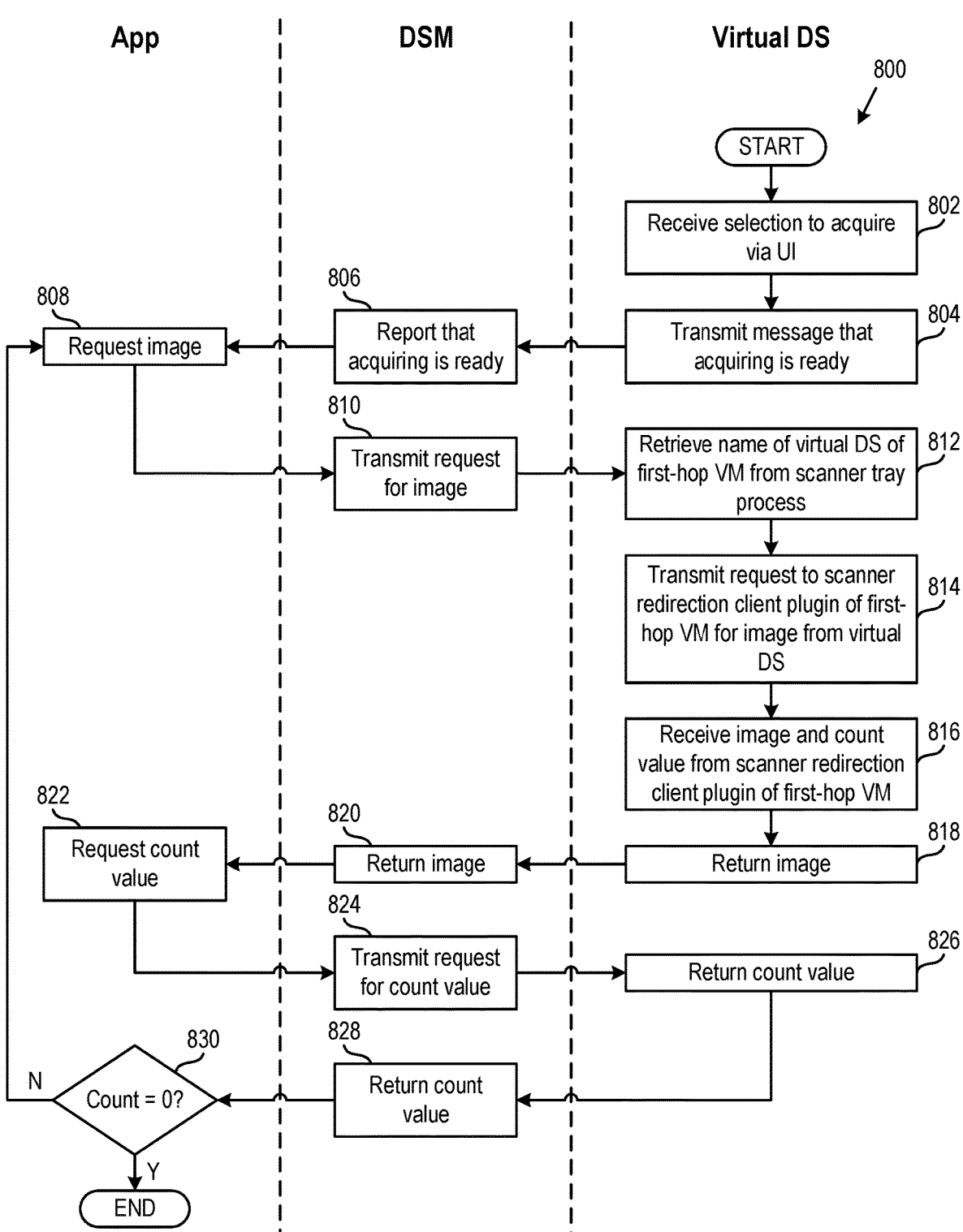
FIG. 8 is a flow diagram of a method performed by the second-hop VM to acquire one or more images through RD scanning, according to embodiments.

FIG. 8 is a flow diagram of a method 800 performed by second-hop VM 164-1 to acquire one or more images through RD scanning, according to embodiments. At step 802, virtual DS 510 receives a selection via UI 518 to acquire an image. For example, the user may click an "acquire" button of UI 518 to trigger the selection. At step 804, virtual DS 510 transmits a message to DSM 500 indicating that acquiring is ready. At step 806, DSM 500 reports to application 168 that acquiring is ready. At step 808, application 168 calls DSM entry 502 to request an image from DSM 500.

At step 810, DSM 500 calls virtual DS entry 514 to transmit a request to virtual DS 510 for the image. At step 812, virtual DS 510 retrieves a selected ICD from scanner tray process 520. Specifically, scanner tray process 520 locates metadata indicating the name of virtual DS 410 of first-hop VM 144-1 and transmits the name to virtual DS 510. At step 814, virtual DS 510 transmits a request to scanner redirection client plugin 240 of first-hop VM 144-1 via a TCP or UDP channel between agent RDPVCB plugin 250 and client RDPVCB 242. The request is for an image from virtual DS 410, the request including the name thereof. Step 814 triggers the method of FIG. 9, discussed further below.

At step 816, virtual DS 510 receives the image and a "count" value from scanner redirection client plugin 240 via the TCP or UDP channel. Count is a variable indicating whether there are any pending images yet to be acquired from a target ICD. A count value of zero indicates that there are no pending images. A nonzero count value indicates that there is at least one pending image.

At step 818, virtual DS 510 transmits the image to DSM 500 as a return value of the call to virtual DS entry 514. At step 820, DSM 500 provides the image to application 168 as a return value of the call to DSM entry 502. At step 822, application 168 calls DSM entry 502 to request DSM 500 for the count value. At step 824, DSM 500 calls virtual DS entry 514 to transmit a request to virtual DS 510 for the count value. At step 826, virtual DS 510 transmits the count value to DSM 500 as a return value of the call to virtual DS entry 514. At step 828, DSM 500 provides the count value to application 168 as a return value of the call to DSM entry 502. At step 830, application 168 checks if the count value is zero. If the count value is nonzero, method 800 returns to step 808, and application 168 calls DSM entry 502 to request another image from DSM 500. Otherwise, if the count value is zero, method 800 ends.

Figure 9:
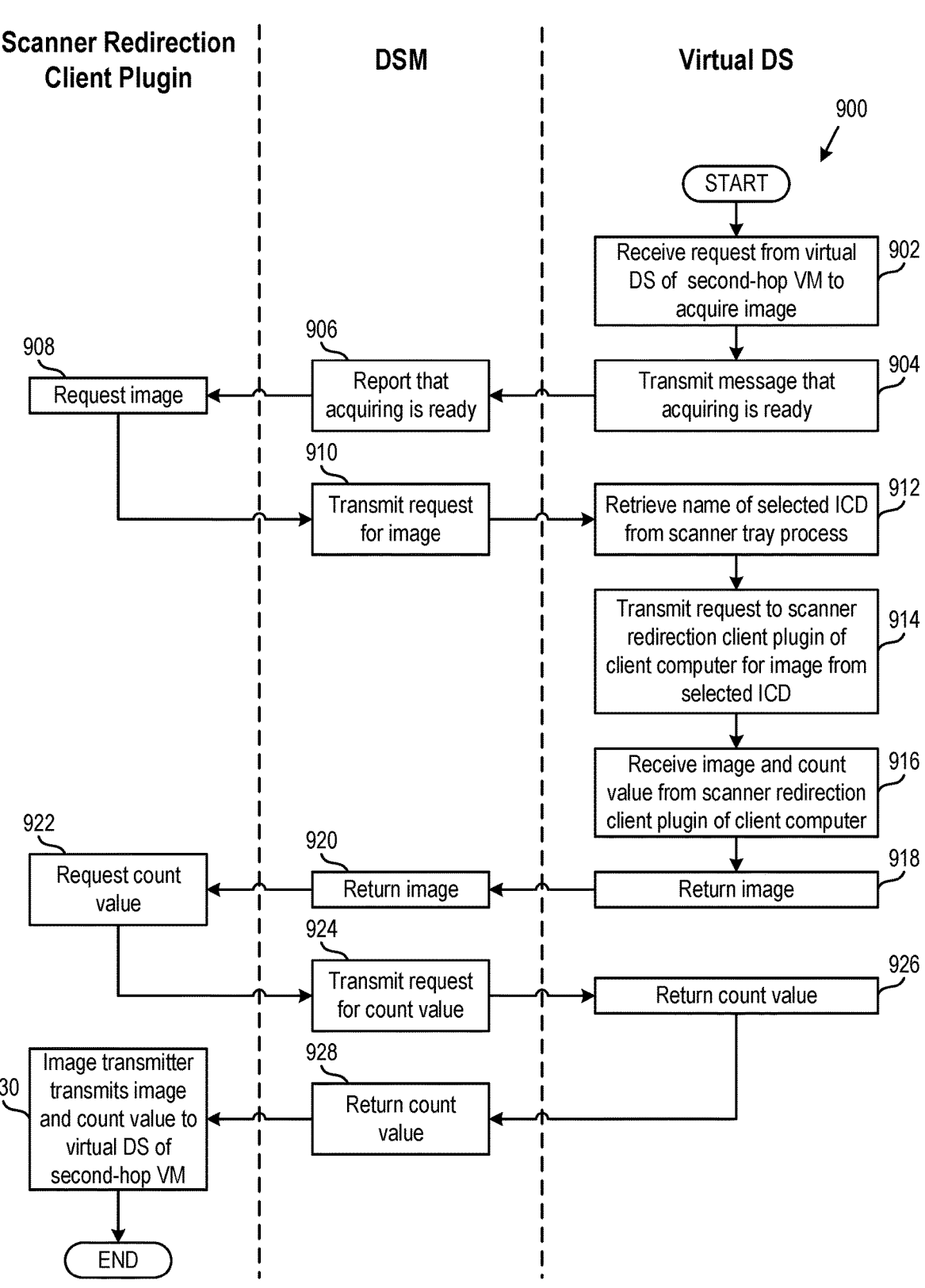
FIG. 9 is a flow diagram of a method performed by the first-hop VM to acquire an image for the second-hop VM, according to embodiments.

FIG. 9 is a flow diagram of a method 900 performed by first-hop VM 144-1 to acquire an image for second-hop VM 164-1, according to embodiments. At step 902, virtual DS 410 receives a request from virtual DS 510 of second-hop VM 164-1 to acquire an image. The request is received over a TCP or UDP channel between client RDPVCB 242 and agent RDPVCB plugin 250. At step 904, virtual DS 410 transmits a message to DSM 400 indicating that acquiring is ready. At step 906, DSM 400 reports to scanner redirection client plugin 240 that acquiring is ready. At step 908, scanner redirection client plugin 240 calls DSM entry 402 to request an image from DSM 400.

At step 910, DSM 400 calls virtual DS entry 414 to transmit a request to virtual DS 410 for the image. At step 912, virtual DS 410 retrieves a selected ICD from scanner tray process 440. Specifically, scanner tray process 440 locates metadata indicating the name of a selected ICD connected to client computer 110 and transmits the name to virtual DS 410. At step 914, virtual DS 410 transmits a request to scanner redirection client plugin 210 of client computer 110 via a TCP or UDP channel between agent RDPVCB plugin 220 and client RDPVCB 212. The request is for an image from the selected ICD, the request including the name thereof. Step 914 triggers the method of FIG. 10, discussed further below. At step 916, virtual DS 410 receives the image and a "count" value from scanner redirection client plugin 210 via the TCP or UDP channel.

At step 918, virtual DS 410 transmits the image to DSM 400 as a return value of the call to virtual DS entry 414. At step 920, DSM 400 provides the image to scanner redirection client plugin 240 as a return value of the call to DSM entry 402. At step 922, scanner redirection client plugin 240 calls DSM entry 402 to request DSM 400 for the count value. At step 924, DSM 400 calls virtual DS entry 414 to transmit a request to virtual DS 410 for the count value. At step 926, virtual DS 410 transmits the count value to DSM 400 as a return value of the call to virtual DS entry 414. At step 928, DSM 400 provides the count value to scanner redirection client plugin 240 as a return value of the call to DSM entry 402. At step 930, image transmitter 420 of scanner redirection client plugin 240 transmits the image and count value to virtual DS 510 of second-hop VM 164-1 via the TCP or UDP channel between client RDPVCB 242 and agent RDPVCB plugin 250. After step 930, method 900 ends.

Figure 10:
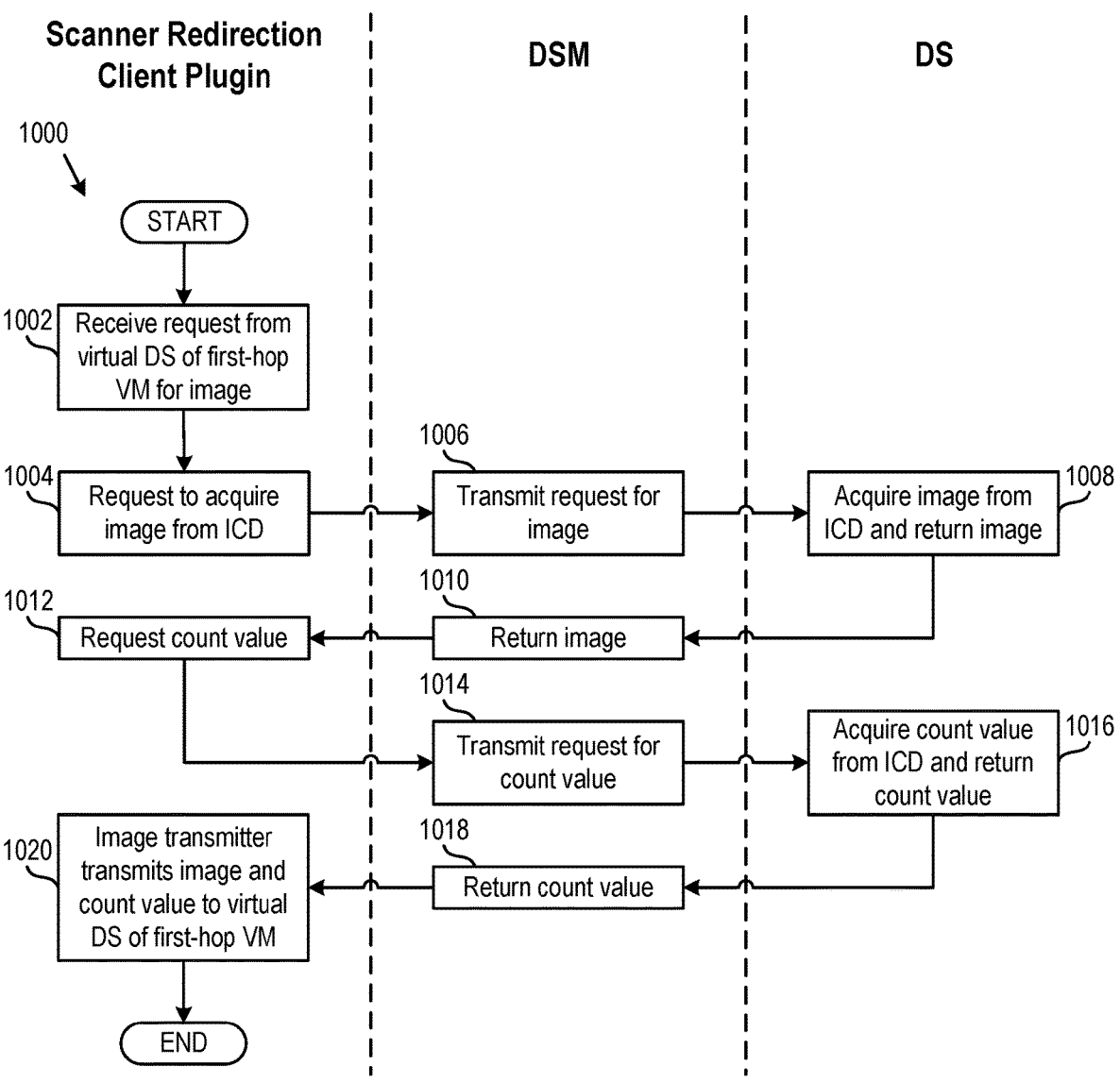
FIG. 10 is a flow diagram of a method performed by the client computer to acquire an image for the second-hop VM, according to the first embodiment.

FIG. 10 is a flow diagram of a method 1000 performed by client computer 110 to acquire an image for second-hop VM 164-1, according to the first embodiment. Method 1000 will be discussed with respect to flatbed scanner 130. However, method 1000 may be performed for any ICD selected for acquiring an image. At step 1002, scanner redirection client plugin 210 receives a request from virtual DS 410 of first-hop VM 144-1 to acquire an image. The request is received over a TCP or UDP channel between client RDPVCB 212 and agent RDPVCB plugin 220.

At step 1004, scanner redirection client plugin 210 calls DSM entry 302 to request DSM 300 to acquire an image from flatbed scanner 130. At step 1006, DSM 300 calls DS entry 312 to transmit a request DS 310 for the image. At step 1008, DS 310 communicates with a driver of client computer 110 to acquire the image from flatbed scanner 130 and transmits the image to DSM 300 as a return value of the call to DS entry 312. At step 1010, DSM 300 provides the image to scanner redirection client plugin 210 as a return value of the call to DSM entry 302. At step 1012, scanner redirection client plugin 210 calls DSM entry 302 to request DSM 300 for a count value.

At step 1014, DSM 300 calls DS entry 312 to transmit a request to DS 310 for the count value. At step 1016, DS 310 acquires the count value from flatbed scanner 130 and returns the count value to DSM 300 as a return value of the call to DS entry 312. At step 1018, DSM 300 provides the count value to scanner redirection client plugin 210 as a return value of the call to DSM entry 302. At step 1020, image transmitter 340 of scanner redirection client plugin 210 transmits the image and count value to virtual DS 410 of first-hop VM 144-1 via the TCP or UDP channel. After step 1020, method 1000 ends.

Figure 11:
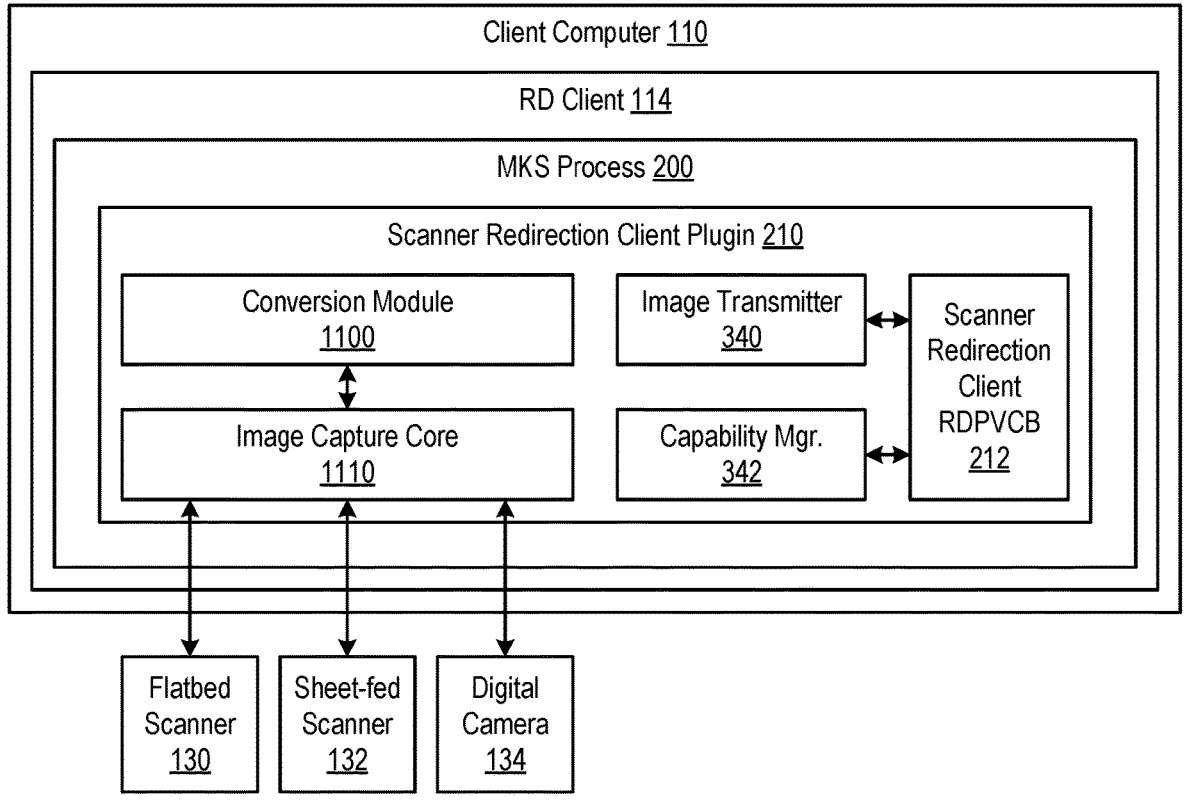
FIG. 11 is a block diagram of the client computer and the group of ICDs connected to the client computer, according to a second embodiment.

FIG. 11 is a block diagram of client computer 110 and the ICDs connected to client computer 110, according to the second embodiment. According to the second embodiment, client computer 110 uses a different scanning protocol than that of first-hop VM 144-1 and second-hop VM 164-1. For example, client computer 110 may use the ICA framework, while first-hop VM 144-1 and second-hop VM 164-1 use the TWAIN protocol. As with the example of FIG. 3, in the example of FIG. 11, there are three drivers installed for controlling flatbed scanner 130, sheet-fed scanner 132, and digital camera 134.

Communication between scanner redirection client plugin 210 and individual components thereof and communication between the individual components, are facilitated via API calls. Like the first embodiment, scanner redirection client plugin 210 includes image capturing software that communicates with ICDs to acquire images therefrom. However, according to the second embodiment, the image capturing software is an image capture core 1110 instead of one or more DSs. When image capture core 1110 acquires an image from an ICD, scanner redirection client plugin 210 instructs image transmitter 340 to transmit the image to first-hop VM 144-1 via client RDPVCB 212.

Because scanner redirection client plugin 210 uses its own scanning protocol, scanner redirection client plugin 210 includes a conversion module 1100. Conversion module 1100 converts data between different scanning protocols. For example, if capability manager 342 receives a request from first-hop VM 144-1 to view capabilities of a particular ICD, then once image capture core 1110 acquires those capabilities, conversion module 1100 converts the capabilities to the scanning protocol of first-hop VM 144-1. Scanner redirection client plugin 210 then instructs capability manager 342 to transmit them to first-hop VM 144-1. If capability manager 342 receives settings from first-hop VM 144-1 to apply to the ICD, scanner redirection client plugin 210 instructs conversion module 1100 to convert the selected settings to the scanning protocol of client computer 110 to be understood by image capture core 1110 and applied to the ICD.

Figure 12:
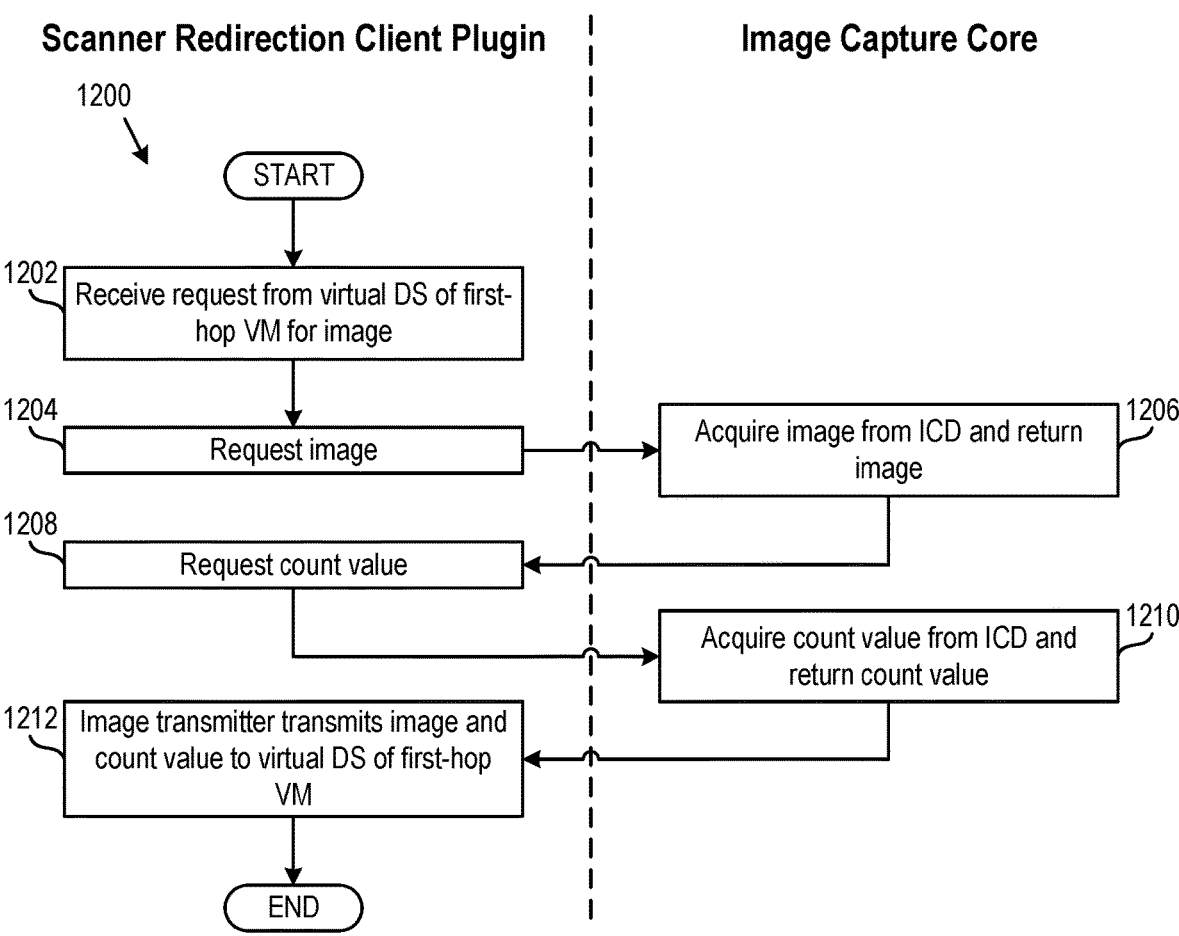
FIG. 12 is a flow diagram of a method performed by the client computer to acquire an image for the second-hop VM, according to the second embodiment.

FIG. 12 is a flow diagram of a method 1200 performed by client computer 110 to acquire an image for second-hop VM 164-1, according to the second embodiment. Method 1200 will be discussed with respect to flatbed scanner 130. However, method 1200 may also be used with other ICDs. At step 1202, scanner redirection client plugin 210 receives a request from virtual DS 410 of first-hop VM 144-1 to acquire an image. The request is received over a TCP or UDP channel between client RDPVCB 212 and agent RDPVCB plugin 220. At step 1204, scanner redirection client plugin 210 makes an API call to image capture core 1110 to request image capture core 1110 to acquire the image from flatbed scanner 130. At step 1206, image capture core 1110 acquires the image from flatbed scanner 130 and returns the image to scanner redirection client plugin 210.

At step 1208, scanner redirection client plugin 210 makes an API call to image capture core 1110 to request image capture core 1110 for a count value. At step 1210, image capture core 1110 acquires the count value from flatbed scanner 130 and returns the count value to scanner redirection client plugin 210. At step 1212, image transmitter 340 of scanner redirection client plugin 210 transmits the image and count value to virtual DS 410 of first-hop VM 144-1 via the TCP or UPD channel. After step 1212, method 1200 ends. It should be noted that image capture core 1110 acquires images from flatbed scanner 130 asynchronously. For example, image capture core 1110 may acquire multiple images and return them all before scanner redirection client plugin 210 requests the count value at step 1208.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are magnetic drives, SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A scanner redirection method for a remote desktop computer system that includes a client computer, a first virtual machine (VM), and a second VM, wherein the client computer communicates with the first VM via a first remote desktop session, and the first VM communicates with the second VM via a second remote desktop session, the scanner redirection method comprising:

receiving by the first VM from the second VM, a first request for an image, wherein the first request for the image is directed to virtual image capturing software in the first VM;

in response to the first request for the image being directed to the virtual image capturing software, transmitting by the first VM to the client computer, a second request for the image, wherein the second request for the image is directed to an image capturing device connected to the client computer, and wherein in response to the second request for the image, the client computer acquires the image from the image capturing device and then transmits the image to the first VM; and upon receiving the image from the client computer, transmitting by the first VM to the second VM, the image received from the client computer.

2. The scanner redirection method of claim 1, wherein client remote desktop software in the first VM communicates with the second VM, and agent remote desktop software in the first VM communicates with the client computer.

3. The scanner redirection method of claim 2, wherein the client remote desktop software receives the first request for the image from the second VM and transmits the image to the second VM, and wherein the agent remote desktop software transmits the second request for the image to the client computer and receives the image from the client computer.

4. The scanner redirection method of claim 1, wherein the first request for the image is directed to the virtual image capturing software in the first VM as a result of a user selection of the virtual image capturing software in the first VM via the second remote desktop session.

5. The scanner redirection method of claim 1, wherein the second request for the image is directed to the image capturing device as a result of a user selection of the image capturing device via the first remote desktop session.

6. The scanner redirection method of claim 1, wherein the client computer, first VM, and second VM use a common scanning protocol, and the client computer uses a data source to acquire the image from the image capturing device.

7. The scanner redirection method of claim 1, wherein the client computer uses a different scanning protocol than that of the first and second VMs, and the client computer uses an image capture core to acquire the image from the image capturing device.

8. A non-transitory computer-readable medium comprising instructions that are executable in a remote desktop computer system that includes a client computer, a first virtual machine (VM), and a second VM, wherein the client computer communicates with the first VM via a first remote desktop session, and the first VM communicates with the second VM via a second remote desktop session, and wherein the instructions when executed cause the remote desktop computer system to carry out a scanner redirection method, the scanner redirection method comprising:

receiving by the first VM from the second VM, a first request for an image, wherein the first request for the image is directed to virtual image capturing software in the first VM;

in response to the first request for the image being directed to the virtual image capturing software, transmitting by the first VM to the client computer, a second request for the image, wherein the second request for the image is directed to an image capturing device connected to the client computer, and wherein in response to the second request for the image, the client computer acquires the image from the image capturing device and then transmits the image to the first VM; and upon receiving the image from the client computer, transmitting by the first VM to the second VM, the image received from the client computer.

9. The non-transitory computer-readable medium of claim 8, wherein client remote desktop software in the first VM communicates with the second VM, and agent remote desktop software in the first VM communicates with the client computer.

10. The non-transitory computer-readable medium of claim 9, wherein the client remote desktop software receives the first request for the image from the second VM and transmits the image to the second VM, and wherein the agent remote desktop software transmits the second request for the image to the client computer and receives the image from the client computer.

11. The non-transitory computer-readable medium of claim 8, wherein the first request for the image is directed to the virtual image capturing software in the first VM as a result of a user selection of the virtual image capturing software in the first VM via the second remote desktop session.

12. The non-transitory computer-readable medium of claim 8, wherein the second request for the image is directed to the image capturing device as a result of a user selection of the image capturing device via the first remote desktop session.

13. The non-transitory computer-readable medium of claim 8, wherein the client computer, first VM, and second VM use a common scanning protocol, and the client computer uses a data source to acquire the image from the image capturing device.

14. The non-transitory computer-readable medium of claim 8, wherein the client computer uses a different scanning protocol than that of the first and second VMs, and the client computer uses an image capture core to acquire the image from the image capturing device.

15. A remote desktop computer system comprising:
a client computer;
a first virtual machine (VM) configured to communicate with the client computer via a first remote desktop session; and
a second VM configured to communicate with the first VM via a second remote desktop session, wherein the first VM is further configured to execute on a processor of a hardware platform to:
receive from the second VM, a first request for an image, wherein the first request for the image is directed to virtual image capturing software in the first VM;

in response to the first request for the image being directed to the virtual image capturing software, transmit to the client computer, a second request for the image, wherein the second request for the image is directed to an image capturing device connected to the client computer, and wherein in response to the second request for the image, the client computer acquires the image from the image capturing device and then transmits the image to the first VM; and
upon receiving the image from the client computer, transmit to the second VM, the image received from the client computer.

16. The remote desktop computer system of claim 15, wherein client remote desktop software in the first VM communicates with the second VM, and agent remote desktop software in the first VM communicates with the client computer.

17. The remote desktop computer system of claim 16, wherein the client remote desktop software receives the first request for the image from the second VM and transmits the image to the second VM, and wherein the agent remote desktop software transmits the second request for the image to the client computer and receives the image from the client computer.

18. The remote desktop computer system of claim 15, wherein the first request for the image is directed to the virtual image capturing software in the first VM as a result of a user selection of the virtual image capturing software in the first VM via the second remote desktop session.

19. The remote desktop computer system of claim 15, wherein the second request for the image is directed to the image capturing device as a result of a user selection of the image capturing device via the first remote desktop session.

20. The remote desktop computer system of claim 15, wherein the client computer, first VM, and second VM use a common scanning protocol, and the client computer uses a data source to acquire the image from the image capturing device.

* * * * *